United States Patent
Kofoed et al.

(10) Patent No.: US 9,588,247 B2
(45) Date of Patent: Mar. 7, 2017

(54) SYSTEM FOR DETECTING A LOCATION OF A SUBSURFACE CHANNEL

(71) Applicant: Willowstick Technologies, LLC, Draper, UT (US)

(72) Inventors: Val O. Kofoed, Spanish Fork, UT (US); Jerry R. Montgomery, West Jordan, UT (US); Rondo N. Jeffery, Roy, UT (US); N. Rich Montgomery, West Jordan, UT (US); Michael L. Jessop, Eagle Mountain, UT (US); Michael J. Wallace, West Jordan, UT (US); Benjamin A. Christensen, Valencia, CA (US)

(73) Assignee: Willowstick Technologies, LLC, Draper, UT (US)

( * ) Notice: Subject to any disclaimer, the term of this patent is extended or adjusted under 35 U.S.C. 154(b) by 243 days.

(21) Appl. No.: 13/778,463

(22) Filed: Feb. 27, 2013

(65) Prior Publication Data

US 2014/0239955 A1  Aug. 28, 2014

(51) Int. Cl.
 *G01V 3/08* (2006.01)
 *G01V 3/10* (2006.01)
(52) U.S. Cl.
 CPC .................................... *G01V 3/10* (2013.01)
(58) Field of Classification Search
 CPC ......... E21B 47/02224; E21B 47/02216; E21B 47/04; E21B 44/00; E21B 47/024; E21B 7/046; G01V 3/081; G01V 3/15; G01V 15/00; G01V 3/165; G01V 3/30; H01Q 1/04; H01Q 7/00; H01Q 1/36; G01R 33/02; G01R 33/0206; G01R 33/04; G01R 33/00; G01R 33/3415; F16F 9/04; F16F 9/3292; G01B 7/003; G01B 7/004; G01D 5/2073; G01D 5/2086
 USPC ............... 324/323–375; 166/250.01–250.17; 702/1–199; 343/703, 709, 718–719
 See application file for complete search history.

(56) References Cited

U.S. PATENT DOCUMENTS

| | | | | |
|---|---|---|---|---|
| 3,636,435 A | * | 1/1972 | Seigel | ........................... 324/334 |
| 4,910,795 A | * | 3/1990 | McCowen | ............. H04R 1/083 381/355 |
| 5,553,492 A | | 9/1996 | Barrett et al. | |
| 5,646,525 A | * | 7/1997 | Gilboa | .................... F41G 3/225 324/207.17 |
| 5,825,188 A | | 10/1998 | Montgomery et al. | |
| 6,002,863 A | | 12/1999 | Sheer et al. | |
| 6,084,403 A | * | 7/2000 | Sinclair | ............... E21B 47/0905 166/255.1 |
| 6,516,212 B1 | * | 2/2003 | Bladen | ..................... A61B 5/06 128/899 |

(Continued)

OTHER PUBLICATIONS

"Unique applications of MMR to track preferential groundwater flow paths in dams, mines, environmental sites, and leach fields", Qian et al. Feb. 2011.*

(Continued)

*Primary Examiner* — Alesa Allgood
(74) *Attorney, Agent, or Firm* — Thorpe North & Western (57) ABSTRACT

A system for detecting a location of a subsurface channel may include a portable frame and a plurality of magnetic coils supported by the frame. The magnetic coils may be spaced apart from one another and ends of each of the magnetic coil are unobstructed by other of the magnetic coils.

30 Claims, 7 Drawing Sheets

(56) References Cited

U.S. PATENT DOCUMENTS

| | | |
|---|---|---|
| 6,603,313 B1 | 8/2003 | Srnka |
| 7,136,756 B1 | 11/2006 | Vieux et al. |
| 7,324,899 B2 | 1/2008 | Zhdanov |
| 8,072,220 B2 * | 12/2011 | Dolgin ................ G01C 21/165 |
| | | 324/228 |
| 8,374,660 B1 * | 2/2013 | Steigerwald ........... H01Q 1/243 |
| | | 343/841 |
| 8,497,684 B2 * | 7/2013 | Cole ................ E21B 47/02224 |
| | | 324/326 |
| 2001/0030539 A1 * | 10/2001 | Montgomery et al. ....... 324/324 |
| 2006/0055584 A1 * | 3/2006 | Waite et al. ..................... 342/22 |
| 2006/0186882 A1 | 8/2006 | Walsh |
| 2007/0294036 A1 | 12/2007 | Strack et al. |
| 2008/0071709 A1 | 3/2008 | Strack |
| 2008/0121430 A1 * | 5/2008 | Cole ................ E21B 47/02224 |
| | | 175/24 |
| 2009/0201024 A1 * | 8/2009 | Bosnar ................ G01V 3/107 |
| | | 324/344 |
| 2009/0224987 A1 * | 9/2009 | Maddaleno ............ H01Q 1/243 |
| | | 343/702 |
| 2009/0273339 A1 * | 11/2009 | Branson ................ G01V 13/00 |
| | | 324/202 |
| 2010/0238762 A1 * | 9/2010 | Hornbostel ..................... 367/17 |
| 2010/0289496 A1 * | 11/2010 | Cole ................ E21B 47/02224 |
| | | 324/343 |
| 2011/0012600 A1 * | 1/2011 | Connor .................. G01V 3/105 |
| | | 324/326 |
| 2011/0123843 A1 * | 5/2011 | Poulsen ............ H01M 10/0431 |
| | | 429/10 |
| 2011/0213205 A1 * | 9/2011 | Uchiyama .......... A61B 1/00009 |
| | | 600/118 |
| 2012/0067644 A1 | 3/2012 | Goswami et al. |
| 2012/0241536 A1 | 9/2012 | Pullen et al. |
| 2012/0280687 A1 * | 11/2012 | Popescu ....................... 324/318 |
| 2013/0197891 A1 * | 8/2013 | Jessop .................... G06T 17/05 |
| | | 703/9 |

OTHER PUBLICATIONS

"White Paper on Willowstick Technology Used for Mapping and Modeling Groundwater Systems"; 2011 Willowstick Technologies LLC.

Kofoed et al. "Unique applications of MMR to track preferential groundwater flow paths in dams, mines, environmental sites, and leach fields"; The Leading Edge; Feb. 2011, vol. 30, No. 2, pp. 936-948.

* cited by examiner

SYSTEM FOR DETECTING A LOCATION OF A SUBSURFACE CHANNEL

BACKGROUND

Current techniques for tracking groundwater or subsurface solutions typically involve geophysical methods such as various forms of galvanic resistivity, electromagnetic conductivity, ground penetrating radar, or the drilling of many observation wells for monitoring. Other forms of tracking and monitoring rely on the measurement of magnetic fields created by electric currents flowing through underground water pathways.

A Mise-a-la-masse method has been used for directly connecting or nearly directly connecting to an ore body. In this method, resistivity or induced polarization (IP) is used as a detection mode. Ground penetrating radar can work well on very shallow targets and where there is no clay in the soil. Use of ground penetrating radar for tracking groundwater or underground solutions of any depth is limited.

Drilling is another option for identifying and/or tracking subsurface water. A drawback to drilling is that drilling does not reveal much more than what is at the location of the drill hole. To establish linkage between holes a tracer solution or some geophysical continuity test can be used. Geophysical techniques used to establish connectivity between holes may place an electrode in one hole at the horizon of interest and then lower another electrode in the second hole to see if there is a response at the horizon of interest in the second hole. This technique may establish connectivity but does not provide a surface trace of the path that the water follows between the drill holes. Confidently mapping a subsurface water system, identifying all branches of a groundwater source, or recognizing all offshoots of the water system can be difficult when limited to drilling and such geophysical methods. In addition, drilling wells is costly and can easily miss narrow streams of groundwater as it produces inconclusive data.

A method to map groundwater using electrical resistance tomography (ERT) and electro kinetic system (EKS) was developed which places many electrodes on the surface and in wells and measures all combinations of resistivity between them. The water or fluids are then caused to move using electro kinetics. Subsequently, the various resistivity combinations are re-measured. This data is combined to create a tomography picture that results from the displacement of the groundwater.

In a method using magnetism, an electric current established directly in the groundwater or aqueous system to be tracked creates a magnetic field which emanates from the ground water through which the electric current flows. The magnetic field is monitored and interpreted to elucidate the nature and location of preferential electric current flow paths following the aqueous system. At least one electrode is placed in direct contact with, or in close proximity to, the aqueous system to be investigated. If the aqueous system to be tracked has a surface expression, an electrode can be placed in the aqueous system flowing from the earth. Additional electrodes are placed in appropriate positions to provide a return path for the current. A wire used to connect the return electrode is run far outside the area of investigation to minimize the effect of the wire's electric and magnetic fields in the data. The current that is conducted through the groundwater path to the return electrode completes the circuit. The system is arranged so that the flow of current is roughly in a large loop. The magnetic field produced by the current can be measured at many locations and the measurements can be used to map the aqueous solution.

Despite the development of the various technologies listed, and others, such methods and technologies are inadequate for many useful applications. Also, ERT, EKS, IP, drilling, and so forth are limited in effectiveness when other electrical lines, magnetic fields, underground physical structures (including metal), and so forth are present. Additionally, use of such technologies in densely populated areas can be difficult.

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

DETAILED DESCRIPTION

While exemplary embodiments are described in sufficient detail to enable those skilled in the art to practice the technology, it should be understood that other embodiments may be realized and that various changes to the technology may be made without departing from the spirit and scope of the present technology. Thus, the following more detailed description of the embodiments of the present technology is not intended to limit the scope of the technology, as claimed, but is presented for purposes of illustration only and not limitation to describe the features and characteristics of the present technology, to set forth the best mode of operation of the technology, and to sufficiently enable one skilled in the art to practice the technology. Accordingly, the scope of the present technology is to be defined solely by the appended claims. Furthermore, various modifications and combinations can be derived from the present disclosure and illustrations, and as such, the following figures should not be considered limiting.

With the general examples set forth herein, it is noted in the present disclosure that when describing the system, or the related devices or methods, individual or separate descriptions are considered applicable to one other, whether or not explicitly discussed in the context of a particular example or embodiment. For example, in discussing a subsurface hydrogeologic system modeling method per se, other device, system, and/or method embodiments are also included in such discussions, and vice versa.

Historically, methods of characterizing and delineating subsurface features have involved direct observation or measurement of subsurface properties. Generally, such methodology involves drilling observation wells. Although this approach can be effective, the approach can also be cost-prohibitive and impractical beyond a certain extent. Furthermore, the approach may yield a limited set of data from which broad interpolations and extrapolations are made. Decisions may be made based on interpolations that fail to depict complex and acute changes that occur in the subsurface. To mitigate risk factors involved in making difficult groundwater related decisions, the present technology enables quick and efficient non-invasive location of preferential groundwater flow paths without harming the environment. Thus, the present technology can significantly reduce time and expense associated with seepage diagnosis or general groundwater characterization, and can be used in conjunction with monitoring well data and/or other hydrogeologic information.

Some prior systems for evaluating subsurface properties have used electromagnetic signals. However, the present technology is not based on the electric and magnetic fields propagating together in what may be referred to as a "coupled" electromagnetic or EM signal. Rather, according to the present technology, a low frequency electric signal can be transmitted and a magnetic field generated by the electric current flow can be measured. At low frequency use, the electric and magnetic fields are not coupled (i.e. the electric and magnetic fields do not propagate together as EM, but separately). The present technology can involve injecting an alternating electric current, or AC current, directly into the groundwater of interest—often, but not limited to, injection down wells rather than at the surface—and not just at spaced intervals on the ground, but rather at various (usually predetermined) strategic locations. An example signal used according to the present technology is a 380 Hz AC signal, though other signal can be alternatively used.

The technology described herein can use the magnetic field to map, track, and monitor subsurface aqueous systems, i.e., ground water solutions, and related geologic structure. This technology can use the magnetic field produced by a precisely controlled electrical current introduced into the groundwater solution of interest. The electric current can flow in the groundwater conductor, creating a magnetic field around the conductor, which is the groundwater. By monitoring the magnetic field, the path of the groundwater can be mapped from the surface. The anomalous changes that occur in the magnetic field and how the field varies with time can be used to map and monitor activity such as seasonal fluctuations, pumping, in situ leaching, and chemical or biological reactions that are taking place in subsurface solutions. These properties are measured using surface readings. Because this technology directly energizes the target horizon there is confirmation that the signal being measured is coming from the designated or desired target. An elementary example which demonstrates the principle of how the present technology operates considers what happens when electric current flows in a wire. A magnetic field is produced that circles the wire. The direction and character of magnetic field is defined by the well-known "right hand rule." If a conductive stream of water or solution replaces the wire, electric and magnetic fields will form directly above the water channel. The magnetic field will be horizontal and perpendicular to the conducting zone just as it would be for a wire. This is also true for a curved conductor. The strongest field strength will be measured directly over the conductor. If measured, the magnetic field traces a path on the surface that follows the path of the conductor, i.e., water, in the ground.

Using an electric current flowing through a wire as an example, a magnetic field is created, looping around the wire. In this example, the magnetic field intensity is given by $B=\mu_0 I/2\pi R$, where R is the radial distance from the center of the wire, I is the current in Amps, and $\mu_0$ is the permeability of free space constant, $4\pi \times 10^{-7}$ Tm/A. The magnetic field's direction is given by the right-hand rule: if the wire is grasped with the right hand so that the thumb points in the direction of positive electric current flow, the fingers curl around the wire in the magnetic field direction. Measured differences in magnitude and direction of the magnetic field are used to identify the vertical and horizontal position of subsurface electric current flow. For example, at a point left of the current source both the vertical and horizontal components of a magnetic field are positive (up and to the right, respectively), or rather both have positive polarity. At a point to the right of the current source, the vertical field is negative (downward) while the horizontal component is still positive, resulting in the vertical and horizontal components having opposite polarity. When surveying over a source of concentrated electric current flow, these changes in the vertical and horizontal signals can be observed.

Although the processes of electrical and hydraulic conduction are governed by different principles, electric current flow can be used to qualitatively infer a general distribution of hydraulic conductance in the subsurface.

Hydraulic conductivity is the ability of a material to conduct water when pressure is applied. Hydraulic conductivity is a function of interconnected pore volume (effective porosity—sometimes referred to as transport porosity). The larger and better connected the pore spaces, typically the greater the hydraulic conductivity and the easier and faster water will flow through the earthen material given a potentiometric gradient.

Electrical conductivity is largely a function of the availability of free ions and the presence of a transporting medium (water) to allow ion movement. Earthen materials commonly act as electrical insulators with electrical conductivities ranging between 10-12 and 10-17 mho/m. In situ measurements of electrical conductivities can range from 10-1 to 10-8 mho/m—many orders of magnitude higher. This discrepancy is due to conduction of electrical current by way of ions dissolved in the groundwater. Recognizing that water can generally be a primary facilitator of electric conduction in a typical geologic environment, the present technology efficiently tracks groundwater paths by detecting differences in the magnetic field intensity arising with changes in electrical conductivity.

The present technology naturally works well in environments where the degree of water saturation and/or transport porosity varies. Generally, it is less effective within a uniformly saturated environment because differences in conductivity are likely to be minimal, unless different groundwater solutions or subsurface porosities with different electrical conductivity characteristics are present. When electrical conduction occurs primarily in an open pore space of a saturated matrix, a positive slope correlation exists between electrical and hydraulic conductivities. As a result, hydraulic conductivity can be tracked along higher electrical conductivity zones. When electrical conduction occurs primarily along pore surfaces, such as in wet clay, the positive correlation may disappear and can in fact become a negative correlation. The present technology can provide valuable information by highlighting edges of zones with greater effective porosity, thus revealing pathways where groundwater flows and areas where groundwater does not flow.

Figure 1:
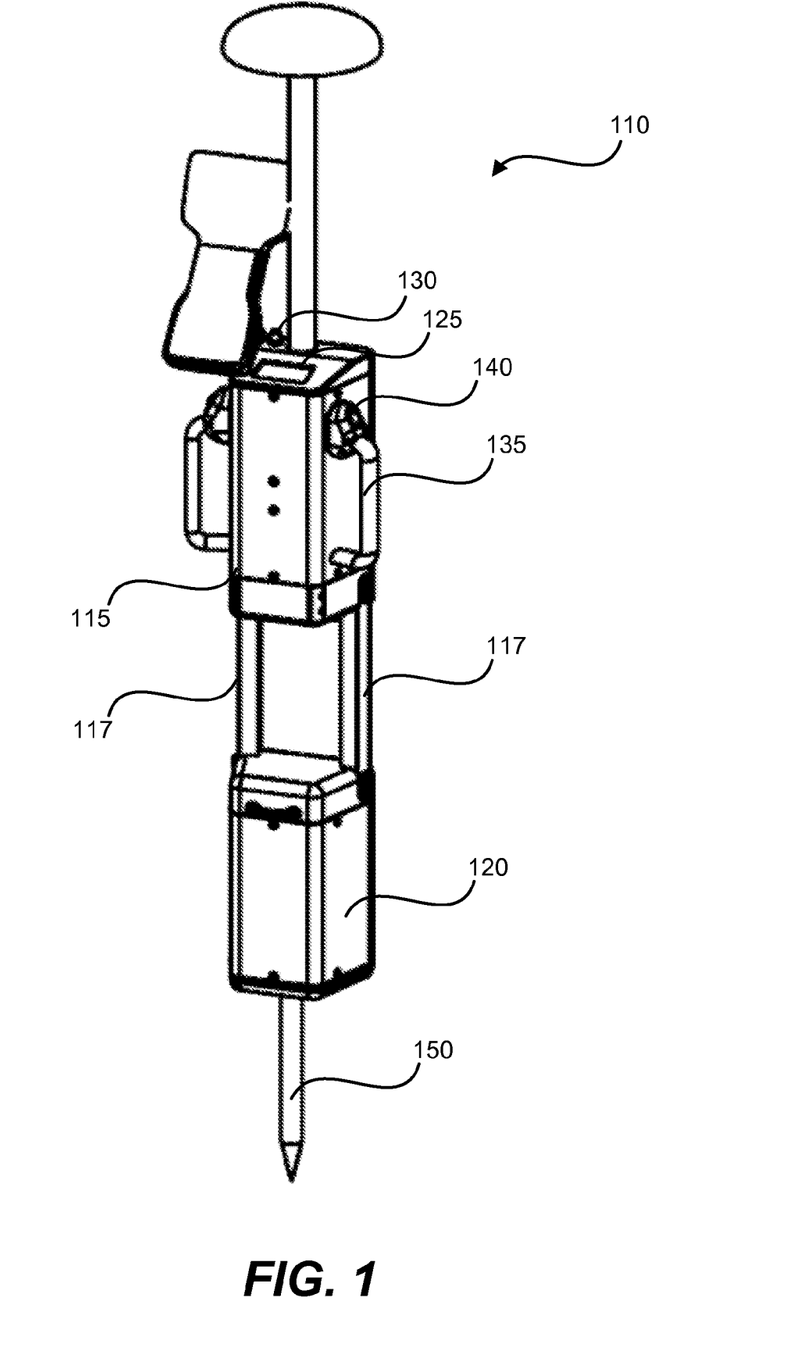
FIG. 1 is an example apparatus for detecting magnetic fields from a subsurface fluid in accordance with an embodiment of the present technology.

Referring to FIG. 1, an apparatus 110 is illustrated for detecting magnetic signals from an electrically energized subsurface aqueous system and for measuring resultant magnetic fields emanating from the energized subsurface aqueous system. For example, the apparatus 110 may collect signal data for use in mapping and monitoring the aqueous system. The signal may be generated by a transmitter/generator coupled to an energizing electrode in contact with the aqueous system, with a return electrode also coupled to the subsurface aqueous solution for completing the circuit. The electric signal may be an electrical signal with a current of from 0.1 to 4.0 amps and with a voltage of from 1 to 300 volts. The apparatus may be relatively small and light weight to be hand-carried between measurement stations. In one example, the signal may be generated at 380 Hz. The 380-Hz signal is not a harmonic of the 60-Hz power used in the United States or 50-Hz power used in Europe, Asia, and Africa. As a result, a same apparatus may be used virtually anywhere in the world without reconfiguration and the generated signal can be relatively easily distinguished from other signals which may also be detected. Thus, as can be appreciated, other signals can likewise be selected, particularly those that are also not a harmonic of 60-Hz or 50-Hz power, though this is not required. With respect to the 380 Hz example described herein (or other preselected signals), the apparatus may include a narrow bandpass filter to filter out signals other than the 380 Hz signals for use with the present technology. In one aspect, the filter may include an active bandpass filter and/or a DSP (digital signal processing) filter.

The apparatus 110 may include a detector 120 to measure magnetic fields. The detector 120 may typically include one or more coils capable of generating an electric current when a magnetic field flux passes within the coil. The detector 120 may be capable of measuring subtle changes in the magnetic field associated with subsurface electric current flow. For example, the detector 120 may be capable of detecting a magnetic field produced by a long wire carrying 1/10th of an amp of current from up to one mile away.

In one aspect, the detector 120 may include at least three coils oriented in at least three different directions. The coils may be very sensitive to small electromagnetic fields. Typical coils have thousands of turns of wire about a central core, which may be a ferromagnetic material. The magnetic coils can have a high-inductance and compact design. In a very specific example, the inductance of each coil can be approximately 60 henries, and the size of each coil may be approximately 5.7 cm in length and 3.8 cm in diameter. Other coils can likewise be used.

Structurally, a detector 120 to measure magnetic fields detected according to the technology includes a plurality of horizontal coils oriented orthogonally to one another and configured to generate a voltage difference when magnetic field flux passes within the horizontal coils. The detector 120 may also include a vertical coil to generate a voltage difference when magnetic field flux passes within the vertical coil. In other words, the three coils may be arranged in x, y and z axes of a Cartesian coordinate space. In one embodiment, a magnetic coil can be oriented in the x direction, a magnetic coil can be oriented in a y direction and orthogonal to the magnetic coil oriented in the x direction, and a magnetic coil can be oriented in a z direction and orthogonal to the magnetic coils oriented in the x and y directions. The coils can be spaced apart from one another and such that the ends of the magnetic coil are unobstructed by one other. In one embodiment, the magnetic coils can be spaced apart from one another by at least one inch and by less than one foot. In another embodiment, the each of the ends of the magnetic coils are unobstructed by other of the magnetic coils.

The orientation of the coils refers to an arrangement and rotation of the coils relative to a level ground surface. In practice, a ground surface where measurements are taken may not be level. While the apparatus may optionally include a level or other leveling device to assist a user in properly orienting the apparatus for obtaining magnetic field data, the apparatus may alternately include a device to measure the angular direction of the coils. For example, one or more accelerometers may be included with the apparatus in the control box 115 to measure an angular orientation of the detector coils. By measuring an angular orientation of the coils, a processor may subsequently process the data collected via the coils to correct for off-vertical alignment of the apparatus when taking measurements. Furthermore, the apparatus 110 may include a digital compass to measure a compass direction of the detector 120 and an orientation relative to geomagnetic North. As with data from the accelerometers, the compass data may be used in a processing step to adjust or correct data for variations or fluctuations in data due to orientation or positioning of the device, which may otherwise introduce errors into the data regarding the subsurface aqueous system.

The apparatus 110 may include a device to measure the position or orientation of the coil(s), such as a GPS (Global Positioning System) device (included in control box 115). For accuracy of data collected, or in other words to more accurately determine precise locations at which magnetic fields are read with the apparatus via the coils and to determine the geographical location of the coils, the GPS device may be a high-grade GPS device capable of providing accurate geolocation readings to within a fraction of a meter.

The apparatus 110 may include a processor, memory and/or storage, and suitable circuitry for collecting, storing and processing data received from the coils, GPS, accelerometer, compass and any other data input devices. For example, circuitry or software may be used for processing phase, polarity, and frequency of measured field signals, for excluding undesired frequency components from the field signals, for amplifying and displaying processed signals, for recording/storing measured and processed data, and so forth. In one embodiment, the circuitry can be configured to read signals measured from at least two of the magnetic coils simultaneously. In another embodiment, the circuitry can be configured to read signals measured from each of the magnetic coils simultaneously. The apparatus 110 may further include a control panel to enable a user to interface with and to manipulate the apparatus. The control panel, processor, power supply and various other components may be included in a control box.

Signals from the coils can be amplified, filtered and digitized by a datalogger or processor. The datalogger may be programmed to calculate spectra and stack the spectra together to reduce incoherent noise like spherics and other short-lived events. The processor can calculate a margin of error and stack more or less data to improve the precision of the measurement. Measurements can be statistically analyzed and repeated until the measurements fall within an acceptable deviation (such as within 10%, for example). A warning may be issued to a user by the apparatus if the signal strength is too low. A measurement and data processing process may take up to a couple of seconds per station or location to measure and calculate the magnetic field strength.

According to the Biot-Savart Law—which describes how magnetic fields are generated by electric currents—the distribution of subsurface electric current flow can be mapped by carefully measuring the magnetic field. A raw horizontal magnetic field contour map—or "footprint" map—can be used to identify the horizontal position of electric current distribution beneath the study area. A vertical position (depth) of fluid can be determined by further processing and modeling. The initial footprint map reveals anomalous areas of high and low electric current flow beneath the study area.

To monitor a site over time, measurements can be repeated at regular intervals, such as every two weeks or every two months, and the data then compared. Comparing the changes in the various components of magnetic and electric field over time provide information relating to fluid movement, changes in chemical activity, changes of fluid in an aquifer, changes in subsurface biological activity, movement of chemical or bio-reaction fronts, leaching progress and activity relating to in situ mining, progress of subsurface chemical or biological remediation, increases or decrease in subsurface flow, changes in salinity, or any change in the groundwater that affects any of its electrical properties. The field intensity readings are mathematically normalized with respect to the energizing electrodes. As current flows through the groundwater channel, some electrical current leaks or diffuses into the surrounding medium. The electrical contrast between the channel and host rock can be evaluated by the rate at which the magnetic and electric fields degrade. Data can be enhanced using distance correction factors.

The apparatus 110 may be configured in a sturdy material. For example, the apparatus 110 may be a hurricane resistant apparatus formed of a carbon fiber shell and backbone with polycarbonate heads and end caps. The apparatus may be sealed to be water resistant even in severe weather conditions. The apparatus may be lightweight and ergonomic and may be easy to hold and steady during a measurement. The apparatus may be balanced for easily carrying by hand using one hand. A shoulder strap may also optionally be included for packing the device around in rough terrain. A foot 150 with a rubber grip or with a spike or the like may optionally be included for maintaining a position of the apparatus relative to the ground. Alternately, the apparatus may include multiple straps and be supported on the back of a user, similar to a backpack, with a button attached or other device enabling easy activation of measurements from in front of the user. The apparatus may further include Bluetooth®, WiFi, or other wireless connections between various components, such as between the GPS and a processor or microcontroller.

In practice, the apparatus is used to measure magnetic fields generated from the flow of an electrical current through subsurface water or fluid. The circuit formed is a large single turn loop consisting of: the electrode in the groundwater, the wire connecting the electrode to the return electrodes, the return electrodes, and the groundwater between the electrodes. This technology in particular deals with that portion of the single turn loop that is formed by the completion of the circuit via the grounded portion of the loop. The grounded portion of this loop creates magnetic and electric fields that are controlled by how the groundwater is distributed in the area between the electrodes. The magnetic field strength will be directly proportional to the current in the groundwater and inversely proportional to the distance above the groundwater. Surface measurements made of both the magnetic field strength and the direction of the magnetic field provides information concerning the position, orientation, and conductivity of the groundwater. Electrical field mapping provides additional information relating to the distribution of the current flowing in the ground water which can be related directly to the subsurface water distribution.

The present technology is based on the concept that electrical current injected into a groundwater source will preferentially follow the groundwater because it is the best conductor in most geologic settings. If no other factors influence the electric current, the magnetic field measurements at the surface will be strongest at the point closest to the groundwater generating the field. This permits the tracing of the underground path through the use of surface maps made from measurements at numerous surface locations of the magnetic and electric fields produced by the underground conductor.

Pure water is a relatively poor conductor. However, groundwater and aqueous solutions are rarely pure water and almost always act as the best conductor at sites where the present technology is applied. This is due to the presence of dissolved ions either from natural or man-made sources. These could include but are not limited to dumped wastes products, leaking subsurface storage facilities, the creation of acid underground, chemical reactions occurring subsurface, the injection of in situ leach solutions, or conductivity changes resulting from biological activity.

The technique of this technology can use either direct (DC) or alternating (AC) current flowing through the subsurface water. A constant DC current source produces a field that is harder to detect with available field measuring equipment, although the use of a Josephsen junction superconductor magnetometer, as one example, can be used for such a purpose. AC or pulsed DC current sources provide a stronger signal, but introduce other factors that may desirably be corrected for accurate interpretation and/or interpolation of data. Inductive effects arising from pulsed DC or AC current may result in the excitation of remote conductors. Inductive effects can generate secondary out-of-phase fields that complicate the measurements.

There are some large sources of electrical noise in the ground that must be accounted for when analyzing magnetic field measurements. One source results from power companies which use the earth for their return circuit for all their power distribution. Thus, as usage changes during the day, the electrical and magnetic fields produced by the returned electrical power will shift and change. These effects are screened by frequency locks between transmitter and detector and corrections obtained from multiple base stations used to monitor the electromagnetic fields. Another noise source is telluric currents created by the electrical currents that the sun generates in the ionosphere. Multiple readings at a base station also help eliminate these influences. Another electrical noise source is distant thunder storms. The electromagnetic pulse generated by lightning strikes becomes trapped in a wave guide between the ground and the ionosphere. Over distance, the currents generated begin to blanket the electromagnetic spectrum usable in this technology. This noise can be corrected using both frequency locks and base station corrections. Frequencies utilized in this technology are selected as ones which are substantially different than any potential interfering or background frequencies.

Water being tracked may be one of several conductors being energized or partially energized. Clay soils often act as a weak conductor producing a broad superimposed field. Nearby power lines or buried cable will produce their own fields and need to be accounted for. The depth of the water from the surface may also vary and will cause variations in the intensity of field measurements. Other potential influences include changes in ion concentration, a broadening of the water stream (sheet flow versus channel flow), and even the wire that is used to energize the water stream and connect a return electrode will generate its own magnetic field. Information concerning the physical properties at the site must then be taken into consideration when any study is undertaken and factored into all interpretation of the data.

Analysis or interpretation of the data can be a multifaceted process. The data can be corrected for diurnals, current drift, and any base intensity changes. For example, to correct a diurnal, the data can be monitored at a base station and the amount of drift or change from the original reading at the base station can be added algebraically to each reading at detector stations. Current drift of the transmitter produces a direct effect on the reading. The current drift is therefore monitored, recorded and used to correct the magnetic field reading for any drift in current. Base intensity changes are due to changes in the conducting medium and can be either algebraically added to the field reading or treated like current drift. The anomalies and interpretation can be facilitated and enhanced by the various treatments. The direction and density of electric current flow can be correlated to the subsurface water channels. The rate of change of the vertical magnetic field intensity across the anomaly is proportional to the width of the current path or indicates the width of the groundwater channel. Width of the horizontal magnetic field is proportional to depth and width of the channel. Correlation of vertical and horizontal magnetic data is necessary to clarify ambiguities of width and depth.

The surface magnetic field provides data on the conductivity of the groundwater being tracked. Chemical or biological activity in or near the conducting groundwater will cause local intensity increases in either the magnetic or electric field through the production of current carrying ions. The location and number of detection sites affects the quality of the data collected. The detection sites are preferably numerous and closely spaced to generate an encompassing map of data.

To collect data, a generator, energizing electrode, return electrode, and connecting wire are placed on the site under investigation. The generator is generally located near the energizing electrode for convenience. In one example, the energizing electrode may be placed directly into contact with a seep. The return electrode may be placed to provide a return path for the current once it leaves the area of interest. The connecting wire may couple the return electrode back to the generator to complete the circuit and may be placed on the ground in such a manner to minimize the effects of its magnetic field on the measurements taken.

The area of interest may be divided into a grid of regular intervals. Measurements may be taken at each point on the grid using the apparatus. Grid spacing can be arbitrary, however smaller spacing provides improved definition of the area under investigation. For example, grid spacing may be as little as 10 feet or less, or as large as 200 feet or more. Measurement station spacing for the grid may depend upon a desired resolution, the target depth, and/or other site conditions. The grid pattern proposed for any particular investigation may be designed to provide sufficient detail and resolution to adequately delineate the groundwater of interest without exceeding budgeted expenses for the investigation.

Figure 2:
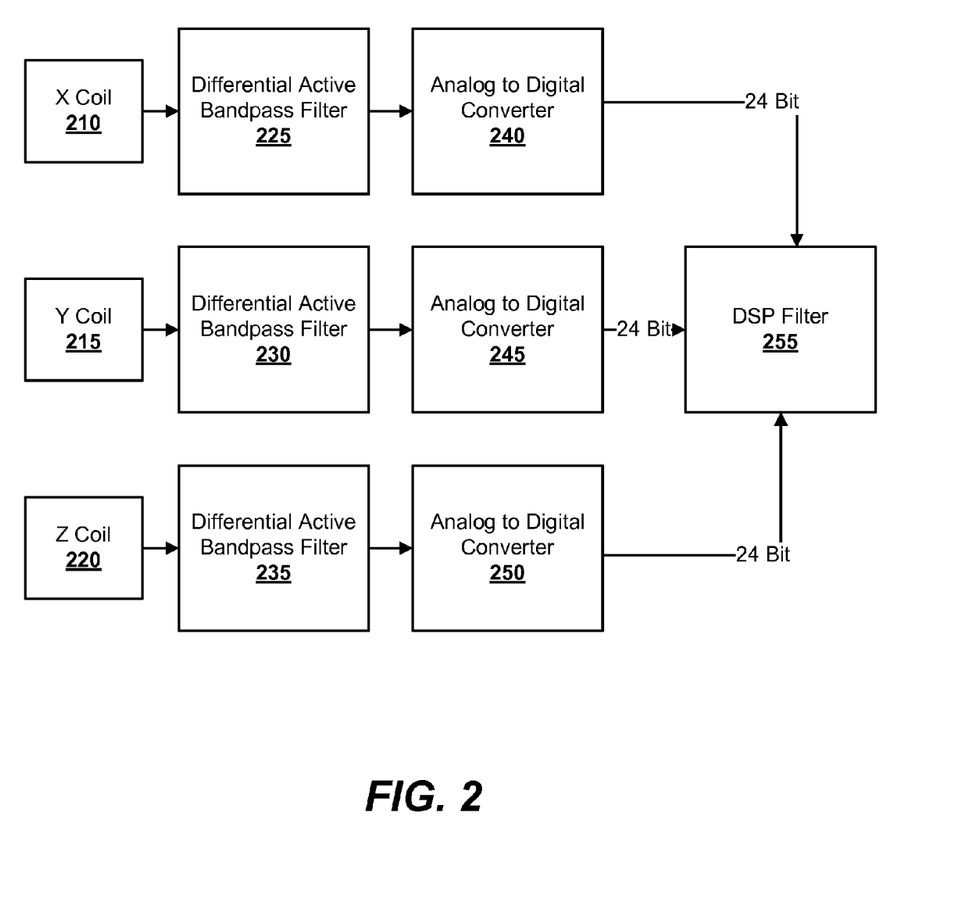
FIG. 2 schematically illustrates a circuit diagram for simultaneously taking measurements from a plurality of coils in accordance with an embodiment of the present technology.

Reference will now be made to FIG. 2. The present apparatus enables simultaneous measurement of two or more of the coils included in the detector. The data collector, or datalogger, may include an advanced digitizer and microcontroller to accept multiple differential input channels without multiplexing. Because measurements may be taken simultaneously, a user of the apparatus may quickly take a measurement and move on. Conventional systems have involved multiple sequential readings at an individual location to obtain a reading from each of the coils in the detector. Furthermore, more time was expended taking the readings due to processing time, configuration of the coils, precise vertical alignment for accurate readings and so forth.

There are many implementations of multichannel geophysical measurements (e.g., seismic, ERT (Electrical Resistivity Tomography) and others). With the present apparatus, the polarity of the magnetic field vector can be determined by comparing time synchronized coil measurements. The apparatus may record the 380 Hz magnetic field simultaneously on each coil 210-220. The signal may be amplified, bandpass filtered 225-235, digitized 240-250 and DSP filtered 255. In the microcontroller, a 1024-point scan may be recorded for each coil using 24 bit data input from the analog to digital converters. A fast fourier transform (FFT) may then be calculated for further processing of the data.

Figure 3:
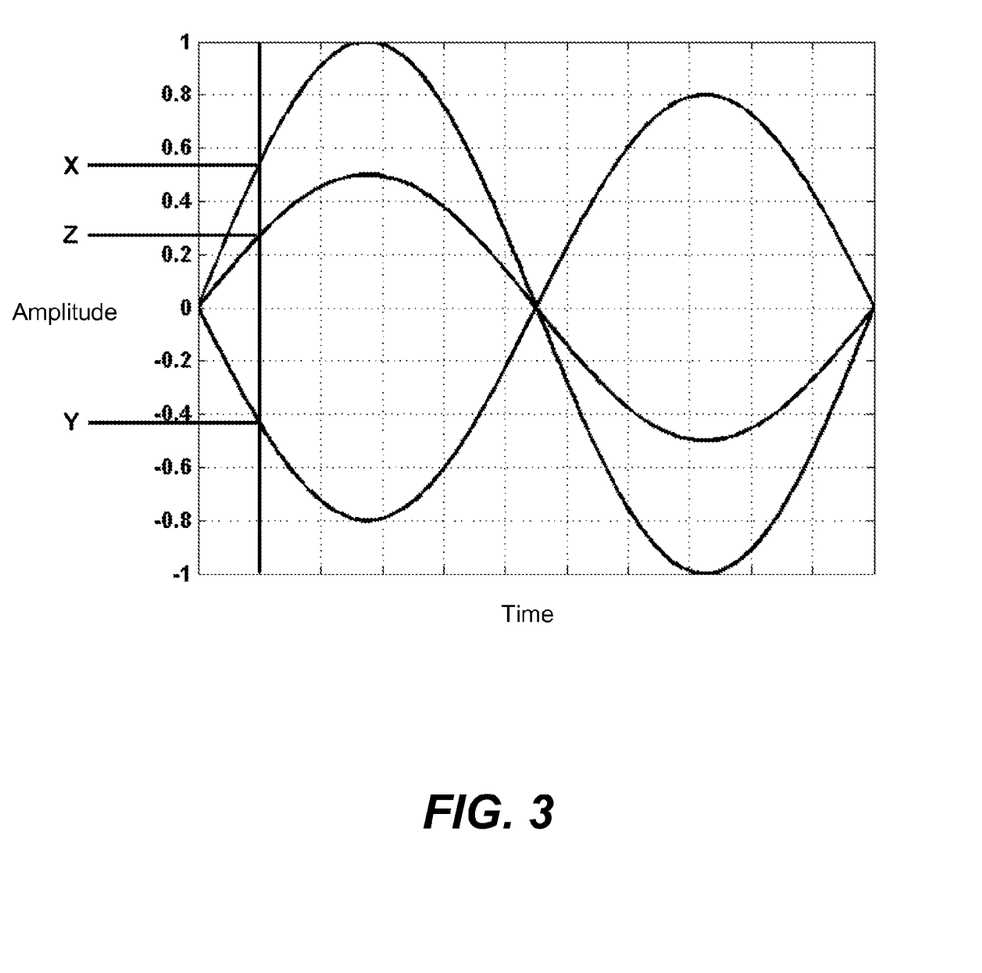
FIG. 3 is a graph illustrating differences in signals taken simultaneously from a plurality of coils in accordance with an embodiment of the present technology.

To get the polarity or direction of the magnetic field vector, the microcontroller may compare the polarity of the Y and Z coil to the X coil, which may be arbitrarily assumed to be positive. For example, FIG. 3 depicts sample readings as may be detected using the X, Y, and Z coils. In this example, the X and Z coil signals have the same polarity because they have positive peaks occurring at the same time. The Y coil signal, however, has negative polarity compared to the X coil signal because the Y coil peaks negative when the X coil peaks positive.

By including coils for each axis and simultaneously measuring magnetic fields detected by the coils, along with the ability to distinguish between the signals from the coils and the ability to take measurements without precise vertical alignment due to the inclusion of accelerometer(s) and compass, the present apparatus may enable significant time savings in measuring and processing collected data over conventional systems. In one embodiment, the accelerometer can be coupled to the plurality of magnetic coils to detect an orientation of the coils when the magnetic field is detected by the plurality of magnetic coils.

Figure 4:
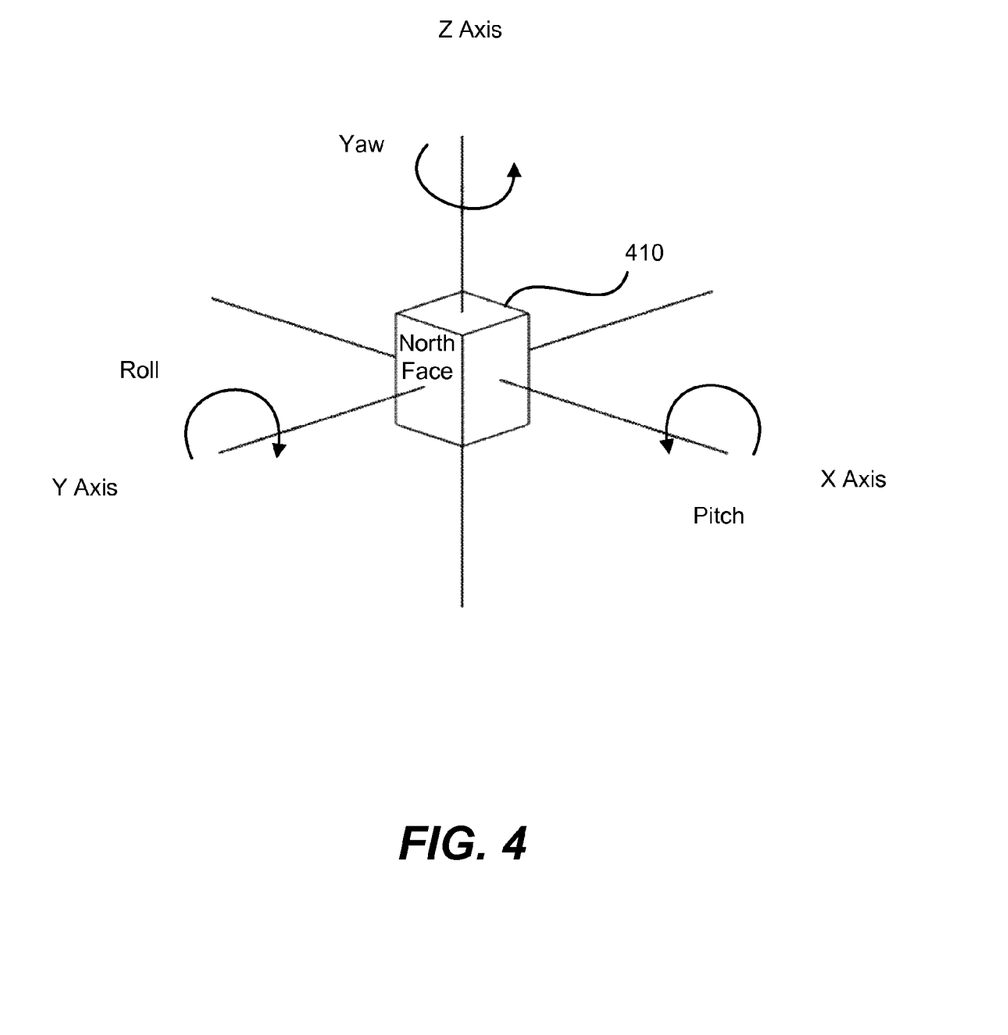
FIG. 4 is a block diagram of an apparatus with an accelerometer for detecting and compensating for non-level positioning of the apparatus in accordance with an embodiment of the present technology.

Referring to FIG. 4, a block diagram of the detector 410 is provided to illustrate the angles (yaw, pitch, and roll) that may be measured to determine orientation of the coils inside the coil box or detector. GPS coordinates may be obtained by the GPS device to determine an accurate position on the earth of the magnetic field measurement apparatus, but these coordinates do not provide information about the orientation of the apparatus or the tilt of the coils. To resolve these issues, the detector may have a face identified as a North face. The compass may provide a rotation angle, or yaw, about the vertical or Z axis. In other words, the compass may provide data for determining the direction of the North face of the detector relative to magnetic North. The accelerometer provides data for identifying or determining tilt angles, or pitch and roll, about the horizontal or X and Y axes. With the accelerometer and compass, the orientation of the coils can be measured and the coil data can be adjusted to a consistent orientation by standard vector rotation mathematical procedures.

Figure 5:
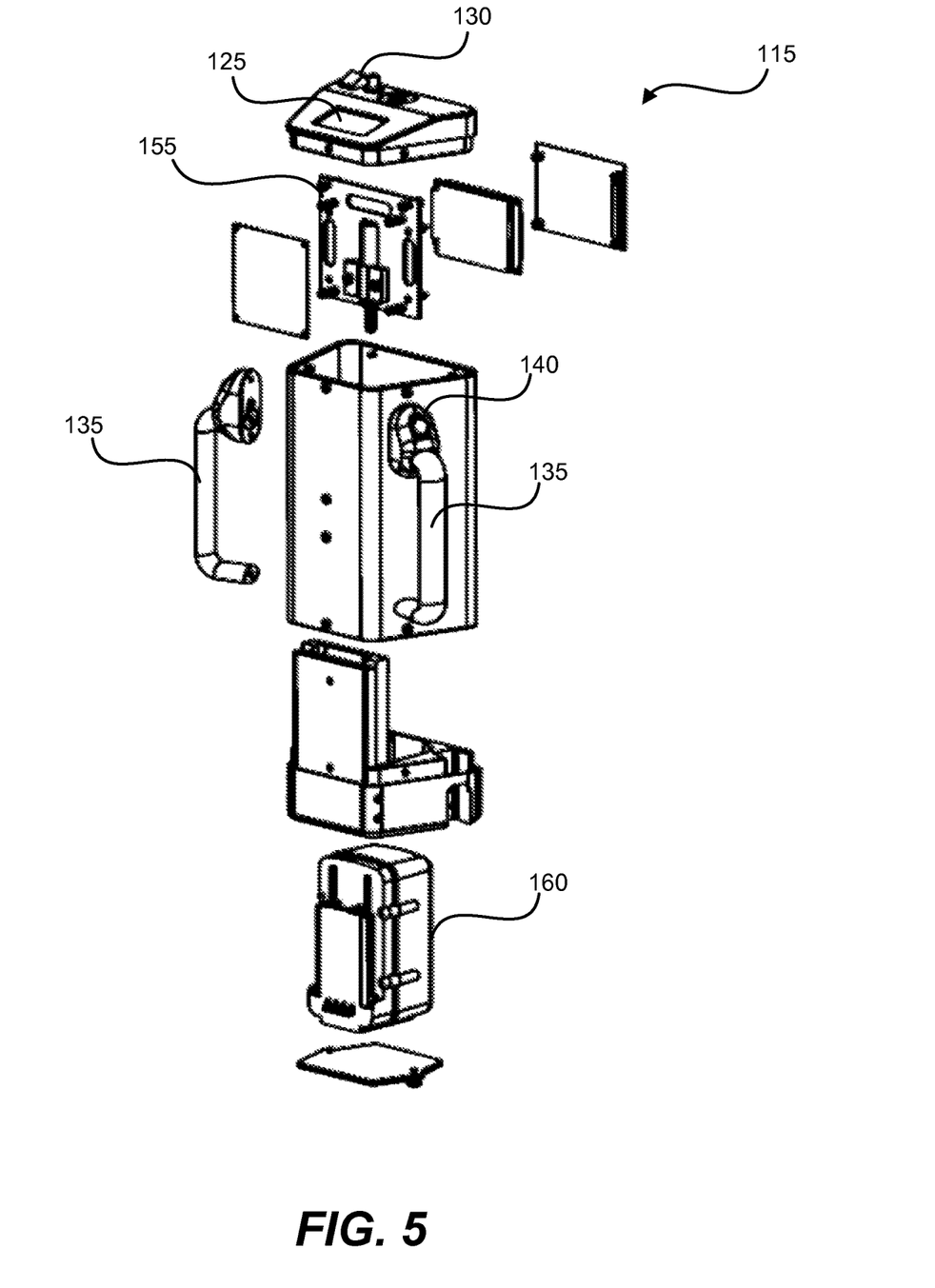
FIG. 5 is an exploded view of a control box of the apparatus of FIG. 1 in accordance with an embodiment of the present technology.

FIG. 5 illustrates an exploded view of the control box 115 shown in FIG. 1. The control box includes an interface, such as may include a display 125, switches 130, knobs or any other suitable interface components for manipulating the control or performance of the apparatus and for monitoring the status or performance of the apparatus. A processor, data storage, GPS, circuitry and other components (collectively illustrated at 155) may be electrically coupled to the interface and may be housed inside the control box. The control box 115 may optionally include handles 135 for carrying the apparatus. The handles 135 may conveniently include triggers 140 for activating the apparatus to take measurements, triggering detection of the magnetic field by using the plurality of magnetic coils simultaneously when the apparatus is at a desired location. The triggers may be in the form of buttons or levers, for example, or any other suitable type of trigger. In one aspect, the apparatus may include a microphone for detecting voice input which may be used for triggering measurements.

The apparatus may include a power source or power supply, such as a battery 160. The battery 160 may be housed in the control box 115 and may provide power for the GPS, interface, processor and other electronic components (collectively shown as 155) of the apparatus. Some components, such as the GPS, for example, may draw more power from the battery than other components. For example, a Hemisphere GPS® Eclipse™ 2 board may draw approximately 1.8 amp-hrs of power, which may be approximately 90% of a total power budget for the apparatus.

In previous systems, the GPS unit and the detector were located separately and the GPS included a dedicated power source. As a result, a power source for use with the detector and associated circuitry was relatively small. For example, a number of 1.5 volt AA alkaline batteries provided sufficient power. Because the power source was relatively small, consideration was not given to a distance between the power source and the coils of the detector, and the power source and coils were placed in close proximity to one another (typically six inches or less) to provide a compact design. With inclusion of the GPS and larger power source to power the GPS in a single measurement apparatus, it has been discovered that there is a negative impact to magnetic field readings when the coils are in sufficiently close proximity to the battery housing or to wires through which current flows. For example, the apparatus may include a large DeWalt® heavy-duty 36 volt rechargeable battery pack. The power demand within the apparatus is significantly increased (from approximately ¼ amp per hour to 2 amps per hour). Because of the increase in size of the power supply and increased proximity to the coils, magnetic field disturbances from the power supply may have a detrimental effect on accuracy and repeatability of readings from the coils, and as a result, it was determined to separate the coils from the electronic components of the apparatus.

Referring back to FIG. 1, the control box 115 is illustrated as physically separated from the detector 120. The control box 115 and detector 120 are arranged in a vertical columnar arrangement, with the control box 115 positioned vertically higher than the detector 120, or above the detector 120. This arrangement serves multiple purposes. For example, positioning of the coils at the bottom of the apparatus 110 positions the coils closer to the ground for enhanced detection of magnetic fields emanating from subsurface aqueous solutions. Positioning the control box 115 up higher than the detector 120 positions the control box 115 for better viewing of display screens and manipulation of the apparatus 110. Arrangement of the control box 115 and detector 120 in a column enables a slim profile that is easy to manually carry from one location to another. Spacing the detector 120 a distance below the control box 115 serves to minimize the negative effect of the battery on the coils and also increases overall balance of the apparatus. A support structure 117 is included between the detector and the control box for supporting the detector 120 when the apparatus 110 is carried by the handles 135 on the control box 115. When the apparatus 110 includes the optional foot component 150, the apparatus 110 may rest on the ground and the support structure 117 can support the control box 115 on the detector 120. In some examples, inclusion of multiple support structure components, such as the two structural components 117 illustrated, can enhance support and balance while also providing additional areas to hold the apparatus for manual carrying, other transportation, or storage. The spacing between the control box and the detector further provides a space for easily removing the battery from the bottom of the control box without significantly dismantling the apparatus for access.

The distance between the battery or other electronic components in the control box and the coils in the detector may vary depending on the current drawn from the battery. Testing may be performed to determine acceptable proximity of the battery or electronic components to the coils before an unacceptable degree of interference is detected. Interference may be defined as a measurable and consistent increase in the relative standard deviation of repeated coil readings. In one embodiment, the spacing between the magnetic coils and the battery source can be such that an electrical current from the batter power source flows away from the magnetic coils. In another embodiment, the spacing can be such that the effect of the battery power source on the magnetic coils is an absolute magnetic field deviation of not more than 1%. In one aspect, a maximum acceptable percentage change in the relative standard deviation is approximately 4% or 2% or 1% or less. In one aspect, interference may be unacceptable if the interference causes more than 2 picoteslas of standard deviation in the signal, or more than 1 picotesla, or more than 0.5 picoteslas of standard deviation of a repeatable signal. In another aspect, the spacing can be such that the effect of the battery power source on the magnetic coils is an absolute magnetic field deviation of not more than 1 picoteslas.

Thus, a minimum distance between the battery and the coils may be defined by a maximum acceptable deviation in the signal detected by the coils as a result of proximity of the battery to the coils. In terms of actual implementation, interference may be caused by a current flowing from the battery to various electrically powered components in the system. Positioning of the coils adjacent to a current from the battery or another electrical current between electrically powered devices or components in the system may cause the interference. Positioning the coils below the battery removes the coils from wires through which current flows and reduces the interference accordingly. A practical maximum distance between the coils and the battery, or other devices through which electrical current flows from the battery (e.g., wires, GPS, etc.), may be dictated by a size or weight of the apparatus resulting from the increased distance. In other words, for repeated portability by a human many times over even large distances in a day, size and weight of the apparatus may be limited. Furthermore, a practical maximum distance may be an arm's reach of a human, or rather from approximately 2.5 to 4 feet.

Figure 6:
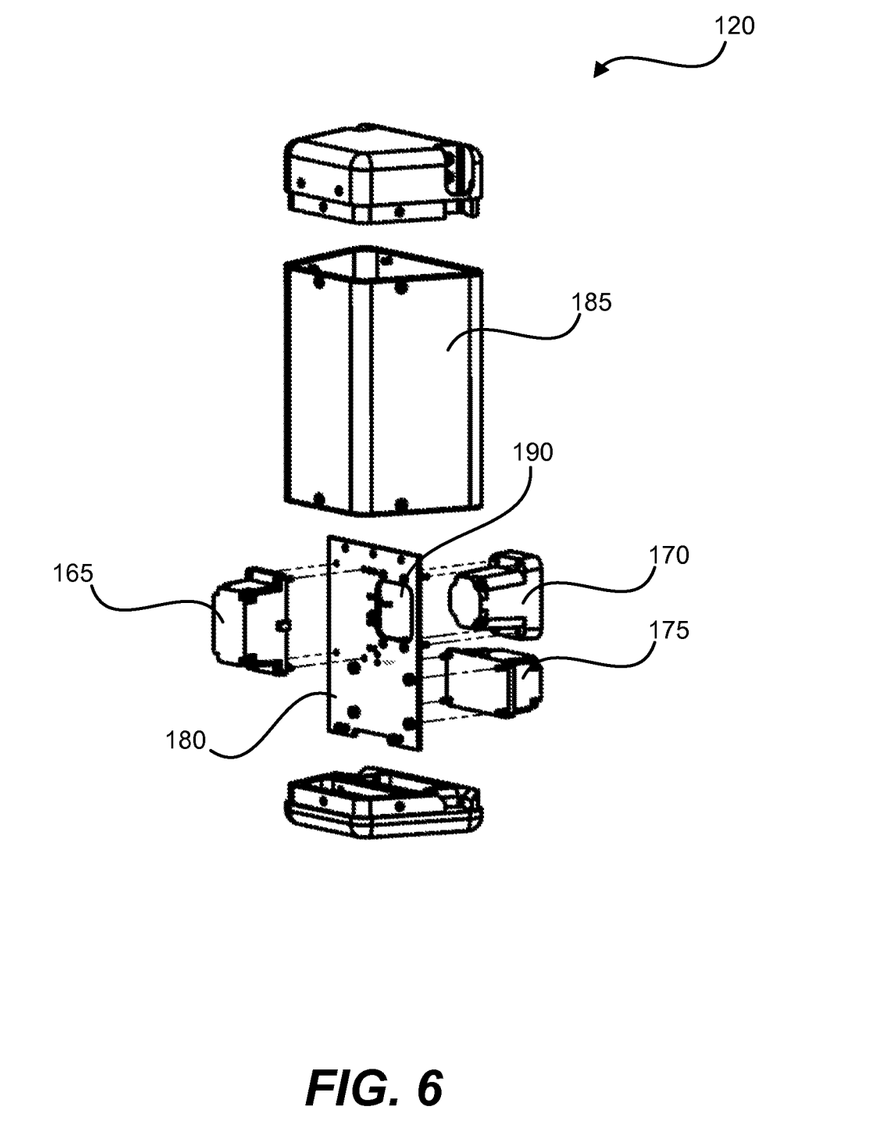
FIG. 6 is an exploded view of a detector of the apparatus of FIG. 1 in accordance with an embodiment of the present technology.

Referring to FIG. 6, an exploded view of the detector 120, or detector box, is illustrated in accordance with an example of the present technology. The detector 120 includes the coils 165-175 described previously. The coils 165-175 may each be enclosed in individual cases to protect the coils from damage. The coils may be coupled to a mounting board 180. Signals from the coils are transferred via electrical conduits inside the support structure between the detector 120 and the control box to the circuitry in the control box for filtering, analog to digital conversion and so forth.

In order to minimize the size of the instrument, the coils 165-175 may be stacked directly on top of one another. In this configuration, the X and Y coils 175 and 170, respectively, may be spaced as close as 0.5 inches to 2 inches apart (edge-to-edge) before cross talk occurs between coils, with a preferable and acceptable distance at approximately 1 inch. However, the Z coil 165 would be separated by up to 6 inches or more to avoid cross-talk. The larger distance results because when stacked, one end of the Z coil 165 points toward the other coils 170-175. It has been discovered that the ends of the coils may be difficult to sufficiently shield by other coils or metal objects without interfering with the magnetic field measurement. Thus, in a preferred arrangement, the coils may be oriented as illustrated in FIG. 6. In other words, the coils 165-175 may be staggered so that the axes or ends of the coils are unobstructed by other coils. To best conserve space while providing such arrangement, or rather to provide a compact design, two of the coils may be arranged on opposite sides of the mounting board 180, such as the Z coil 165 being on one side and the X coil 175 on the opposite side. This allows close physical spacing of the coils while avoiding obstruction of ends of the coils by other coils. The Y coil 170 may be positioned on either side of the mounting board, or as illustrated may be coupled through a hole 190 in the mounting board 180. Positioning the Y coil 170 through the hole 190 enables a smaller profile of the coil-mounting board combination because the length of the Y coil 170 can extend along the depth/width of the Z and X coils 165 and 175, where otherwise, the length of the Y coil 170 would extend further past the depth/width of the Z or X coils 165 and 175 and result in a larger overall profile of the detector when the Y coil 170 does not pass through the mounting board 180. The spacing of the X, Y and Z coils 165-175 on the mounting board 180 may still be such that the coils are located roughly 1 inch (edge-to-edge) apart from one another. Altogether, a width of the mounting board and coils may be approximately 5-6 inches or less. A depth of the mounting board and coils may be approximately 3.5-4.5 inches or less. A height of the mounting board and coils may be approximately 4-5 inches or less. A cover 185 for the detector 120 may be sized and shaped to fit around the mounting board and coils without significant excess size or space. Altogether, the detector may occupy an area of approximately 2 square feet or less, or approximately 1.5 square feet or less of the mounting board. In one aspect, the mounting board may have a surface area of approximately 0.25 square feet. A volume occupied by the detector may be approximately 0.25 cubic feet or less or 0.15 cubic feet or less or 0.1 cubic feet or less. In one aspect, the volume occupied by the detector may be approximately 0.08 cubic feet.

Figure 7:
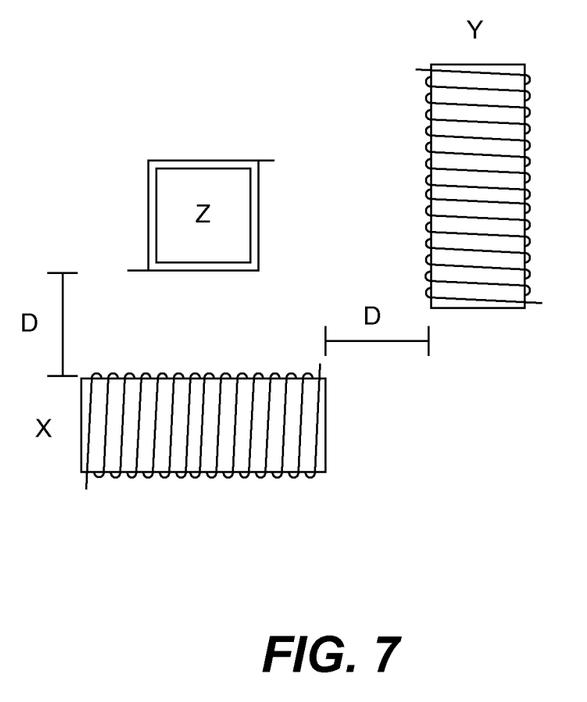
FIG. 7 is a block diagram of spacing between coils oriented along a plurality of different axes in accordance with an example of the present technology.

FIG. 7 illustrates the X, Y and Z coils with at least the minimum spacing D between the coils to minimize crosstalk or interference between the coils in accordance with an example of the present technology. It is noted that a significant portion of a subsurface signal may be expressed through magnetic fields detected by the X and Y coils, and as a result, a higher degree of interference for the Z coil may be acceptable than for the X or Y coils. Thus, for example, the Z coil may be closer to electronic components than the X or Y coils or may be closer to the X and Y coils individually than the X and Y coils are to one another.

It is noted that for prior technology where signals from the X, Y and Z coils are read sequentially, cross-talk was not as large of an issue, particularly where one or two coils were used with at least one coil being rotated between multiple axes for the multiple readings. However, where simultaneous reading of the coils has been enabled, reconfiguration of the coils may preserve space while avoiding crosstalk to enable more accurate and efficient rapid readings of the magnetic fields in multiple axes. In one aspect, at least two of the three coils may be read simultaneously using same clock cycles of the processor, which may include non-simultaneous start and stop read times for the coils. As has been described, reading of the coils simultaneously enables a determination of each coil's polarity with respect to one another. When readings are sequential, variables may change between multiple readings, such as from external interference, fluctuations in the subsurface aqueous system and so forth. The simultaneous readings thus become more accurate and repeatable than with prior technology. Simultaneous reading of the coils enables more accurate and more rapid comparison of coil measurements to determine the magnetic field direction and the flow direction of electric current in the subsurface aqueous system, which may in turn affect how a survey proceeds.

When using the present technology to monitor activity such as movement, chemistry changes, or bioactivity, establishment of a reference survey can be useful. This reference survey can be a base to which all subsequent surveys may be compared. The difference between the fields measured for the separate surveys are used to evaluate and determine the extent and magnitude of subsurface changes in the conducting solution under observation. This aspect of the present technology can be used, for example, as follows:

1. Track tracers (i.e., salt) solution injected in wells.
2. Monitor subsurface chemical reactions by monitoring the change in ion concentration via changes in the magnetic field.
3. Where in situ leaching solutions are in use, permanent stations are established to track the reaction front, movement of the underground fluids, or areas where the solution intersects a non reactive area. For such an activity, constant monitoring may be required.
4. Biological reactions can be monitored because they affect the number of ions in the solution.

Implementation of these applications will change the flow of electric current in the subsurface and will result in changes in the magnetic fields measured at the surface. Changes in the magnetic field thus correlate directly to changes in the study area.

Following are some examples of how the present technology can be used in various subsurface water monitoring applications. These are presented as non-limiting examples and are not intended to cover all situations involved in tracking groundwater.

1. Groundwater, Follow Groundwater Channels, Maps Groundwater Structures

This is the foundation technology upon which all the following applications are built. Electrical energy is injected into the groundwater of interest. The magnetic fields generated by that injected current are monitored, measured and used to map its course from the surface.

2. Track and Monitor Subsurface Pollution Plumes

An electrode is placed in the groundwater influencing the transport of the contaminates, and electrical energy is injected. The magnetic fields generated by the groundwater are used to map the groundwater flow paths influencing the plume and identify any branches that might go undetected by a systematic drilling program.

3. Locate the Source and Feeder System of Springs or Seeps

An electrode is placed in the seep or spring. A wire is extended from the injection electrode to return electrodes in the suspected path of the water. This wire, the electrodes, and the water, form a conducting loop. Stations are measured along selected profiles. The primary parameter of interest for this type of survey is the horizontal magnetic field measurement which is determined by measuring the current generated at receiving coils by magnetic field flux lines passing through a single or multiple turn coil. The data are corrected for drift, distance, and current variations. Interpretation involves three types of data: (1) contours of corrected horizontal magnetic field, (2) profiles of the horizontal magnetic field, and (3) vectors of the minimum horizontal magnetic field.

4. Map Interconnected Fracture or Porous Zones

Place an electrode in one zone and the return electrode in the second. By mapping the surface magnetic field the interconnection of water between the two zones can be identified, and mapped on the surface. Variations in the contour of the surface map of the magnetic field will give an indication of variations in the depth or shape of the fracture or zone surveyed.

5. Maps or Trace the Path of Leaks in Earthen Dams, Maps Leaks in Drain Fields

For a dam the leak is energized. The reservoir is used for the return electrode. The current will follow the water in the earthen dam back to the water in the impounded area. Thus, the path of the leak is illuminated and mapped by the resulting magnetic field.

For a drain field an electrode is placed in direct contact with the water emanating from the drain. The placement of multiple return electrodes surrounding the drain field allows the electrical current to find the best path through the drain field, which will be the water's path, to complete the electrical circuit or loop. The wire used to connect the return electrode is run as far from the area of investigation as possible to minimize the effect of its field on the study. The survey is conducted over the area covered by the drain field. Drains with water in them will be energized, and dry drain pipes will not conduct electricity so they will not be energized. Measurement of the magnetic field will map the conducting (wet) drains.

6. Monitor Changes in Subsurface Water Flow, Monitor Movement and Changes in Subsurface Solutions, This technology will monitor the depression cone created by pumping subsurface water yielding information on the lateral extent of draw down. The dispersion cone decreases the volume of the electrical conductor in the area, decreasing its ability to conduct electricity as well resulting in a decrease in the magnetic field. The replenishment of the cone results in a subsequent increase in nearby magnetic fields. By following the decrease or increase in magnetic field it is possible to track and monitor the movement of the depression cone. Changes in the magnetic field can also be used to detect the direction of flow that replenishes the depression cone.

7. Monitor Changes in Ion Concentration in Groundwater, Monitor in Situ Leaching Solution, Monitor Solution Pathways in Heap Leaching Operations This technology can monitor changes in groundwater such as changes in volume over time or changes in conductivity due to factors such as increased dissolved solids or dilution. By directly charging the fluids involved and measuring the electromagnetic field changes as they occur, this technology can be used to accurately track the progression of solutions or reactions as they move and spread in the subsurface. Measurements using this technology are dynamic and can be conducted whenever observations are necessary to detect possible changes in the subsurface flow or concentration.

In situ mining such as solution mining is a promising and potentially environmentally-benign technology for mining metals. The technology involves the injection of leaching solutions into an ore zone at an injection well and then recovering loaded solution through recovery at production wells. It is generally assumed that all the leaching solutions injected will be recovered by withdrawing more solution, i.e., injected solution plus groundwater, than is injected. Another assumption is that sufficient information about the fracture pattern can be collected by an extensive drilling program to predict flow in the leach zone. Drilling could miss fracture zones or other porous zones within the ore body. The present technology can locate fracture zones or other structures that could interfere or alter the flow of leaching solutions. The present technology permits monitoring of all changes that occur during the leaching process, provides the ability to monitor the movement of solutions through the fractured ore zones, and validates the assumption that all injected solutions can be recovered and none will escape. The present technology permits improved monitoring of the solution and allows the detection of stray fluid streams before they become a problem, as well as making it possible to determine the need to drill any intercept or additional collection holes required to prevent leach solutions from reaching areas surrounding the intended leach zone.

The present technology further makes it possible to map the progress and course of leaching solutions in a heap leach mining operation. The process is very similar to that described for monitoring in situ leaching.

8. Monitor Changes in Subsurface Redox or Reaction Fronts, Monitor Underground Chemical Reactions As chemical reactions occur underground, the number of ions in solution changes. This will increase or decrease the conductivity of the groundwater. These changes can be used to detect where acid is being generated in underground locations and how active the process is. This can be used to monitor chemical reactions such as heap or in situ leaching, contaminate remediation, or biological reactions.

9. Monitor Subterranean Bioreaction

Bioreactions will affect and change the ion content of groundwater or other involved solutions. These changes are monitored via the variations that occur in the magnetic and electric fields. Monitoring of underground bioactivity can be used to observe the effectiveness and extent of microbes that are being used to clean up underground pollution. This technology enables monitoring the mobilization of underground substances or the changes that occur in compounds during subsurface bioremediation.

10. Subsurface Waters and Related Geologic Structures

The mapping of related geologic structures is a byproduct of mapping the location of groundwater. Structures which effect where subsurface water can or cannot move can be inferred from how groundwater is distributed.

Various criteria can be used to determine the quality of the magnetic field data measured and recorded by the detector (i.e., the magnetic field detection device). Some examples may include:

1. Circuit continuity between electrodes;
2. Signal-to-noise ratios; and
3. Signal repeatability (e.g. statistical variance of the signal)

The systems and methods herein can quickly and accurately infer the location of groundwater and preferential flow paths. The systems and methods do not necessarily identify the volume of water or the direction of flow along a particular pathway, but such information can be determined by other field methods such as pump tests, water bearing formation characteristics, regional groundwater flow, topographic slope, potentiometric head differences, and so forth, which may be performed in conjunction with use of the present technology.

The present technology delineates and characterizes subsurface aqueous systems in complex hydro geologic settings. Some example uses of the systems and methods herein include: 1) the diagnosis of seepage through earthen dams and levees; 2) characterizing groundwater infiltration into surface and subsurface mines; 3) tracking pollution plumes influenced by groundwater transport; 4) optimizing well placement for production and/or monitoring purposes; 5) identifying and mapping geothermal production zones; 6) delineating salt and fresh water reaction fronts; and 7) optimizing water flood activities in oil and gas recovery operations as well as other in-situ solution mining processes.

The methods and systems of certain examples may be implemented in hardware, software, firmware, or combinations thereof In one example, the method can be executed by software or firmware that is stored in a memory and that is executed by a suitable instruction execution system. If implemented in hardware, as in an alternative example, the method can be implemented with any suitable technology that is well known in the art.

Reference throughout this specification to "one example", "an example", or "a specific example" means that a particular feature, structure, or characteristic described in connection with the example is included in at least one example of the present technology. Thus, the appearances of the phrases "in one example", "in an example", or "in a specific example" in various places throughout this specification are not necessarily all referring to the same example. Furthermore, the particular features, structures, or characteristics may be combined in any suitable manner in one or more examples.

Other variations and modifications of the above-described examples and methods are possible in light of the foregoing disclosure. Further, at least some of the components of an example of the technology may be implemented by using a programmed general purpose digital computer, by using application specific integrated circuits, programmable logic devices, or field programmable gate arrays, or by using a network of interconnected components and circuits. Connections may be wired, wireless, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, the signal arrows in the Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Various functions, names, or other parameters shown in the drawings and discussed in the text have been given particular names for purposes of identification. However, the functions, names, or other parameters are only provided as some possible examples to identify the functions, variables, or other parameters. Other function names, parameter names, etc. may be used to identify the functions, or parameters shown in the drawings and discussed in the text.

Amounts and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. A system for detecting a location of a subsurface channel, comprising:
   a detector box, comprising:
     a magnetic coil oriented in a x direction,
     a magnetic coil oriented in a y direction and orthogonal to the magnetic coil oriented in the x direction, and a magnetic coil oriented in a z direction and orthogonal to the magnetic coils oriented in the x and y directions,
wherein the magnetic coils in the x, y and z directions are spaced apart from one another and ends of each of the magnetic coil are unobstructed by each of the other of the magnetic coils, wherein the magnetic coils measure magnetic field generated by electric current flow through the subsurface channel, and wherein the system is capable of being hand carried between measurement stations; and
a battery power source,
wherein the magnetic coils are spaced apart from the battery power source at a distance such that an effect of the battery power source on the magnetic coils is an absolute magnetic field deviation of not more than 1 picotesla.

2. The system of claim 1, wherein each of the magnetic coils are spaced apart from both of the other magnetic coils by at least one inch and less than one foot.

3. The system of claim 1, wherein the magnetic coils are spaced apart from the battery power source such that an electrical current from the battery power source flows away from the magnetic coils.

4. The system of claim 1, wherein the magnetic coils are spaced apart from the battery power source at a distance such that an effect of the battery power source on the magnetic coils is an absolute magnetic field deviation of not more than 1%.

5. The system of claim 1, further comprising circuitry configured to read signals measured from at least two of the magnetic coils simultaneously.

6. The system of claim 1, further comprising circuitry configured to read signals measured from each of the magnetic coils simultaneously, wherein the signals are compared to establish polarity for determining a preferential flow path of the subsurface channel.

7. The system of claim 1, further comprising an accelerometer to measure an orientation of the coils.

8. The system of claim 1, further comprising a compass for measuring an orientation of the coils.

9. The system of claim 1, further comprising GPS for measuring a geographical location of the coils.

10. The system of claim 1, further comprising a battery and wherein the battery and the detector box comprising the magnetic coils are positioned in a columnar arrangement with the magnetic coils suspended beneath the battery and spaced apart from the battery by a distance.

11. The system of claim 1, wherein the magnetic coil oriented in the x direction surrounds a central core of ferromagnetic material, the magnetic coil oriented in the y direction surrounds a central core of ferromagnetic material, and the magnetic coil oriented in the z direction surrounds a central core of ferromagnetic material.

12. A mobile system for detecting a location of a subsurface channel, comprising:
a detector box including a plurality of magnetic coils configured to detect a magnetic field from a subsurface water channel; and
a battery power source spaced apart no more than 4 feet from the plurality of magnetic coils, but still at a distance such that an absolute magnetic field deviation of a signal detected by the coils as a result of proximity of the battery power source is not greater than 1 picotesla, wherein the battery power source and the detector box housing the plurality of magnetic coils are in a columnar arrangement with the battery power source being positioned farther from the subsurface water channel than the plurality of magnetic coils when the system is in an upright position.

13. The mobile system of claim 12, further comprising a handle coupled to a control box for carrying the mobile system, the handle including a trigger for triggering detection of the magnetic field using the plurality of magnetic coils simultaneously.

14. The mobile system of claim 12, further comprising an accelerometer coupled to the plurality of magnetic coils to detect an orientation of the coils when the magnetic field is detected by the plurality of magnetic coils.

15. A system for detecting a location of a subsurface channel, comprising: a detector box, comprising: a magnetic coil oriented in a x direction; a magnetic coil oriented in a y direction and orthogonal to the magnetic coil oriented in the x direction; and a magnetic coil oriented in a z direction and orthogonal to the magnetic coils oriented in the x and y directions, wherein ends of each of the magnetic coils are unobstructed by both of the other magnetic coils such that the ends of each of the magnetic coils do not interfere with either of the other magnetic coils when the magnetic coils are all simultaneously sensing magnetic field, and wherein each of the magnetic coils are spaced apart from both of the other magnetic coils by at least 0.5 inches, wherein the each of the magnetic coils are coupled to a mounting board, wherein at least one of the magnetic coils is coupled to each side of the mounting board, and wherein each of the magnetic coils and the mounting board are arranged in the detector box having a volume of approximately 0.1 cubic feet or less.

16. The system of claim 15, wherein each of the magnetic coils are spaced apart from both of the other magnetic coils by approximately 1 inch.

17. The system of claim 15, wherein at least one coil extends through a hole in the mounting board.

18. The system of claim 15, further comprising an accelerometer coupled to the magnetic coils to detect an orientation of the magnetic coils when the magnetic field is detected by the plurality of magnetic coils.

19. A mobile system for detecting a location of a subsurface channel, comprising:
a detector box comprising a plurality of magnetic coils configured to detect a magnetic field from a subsurface water channel;
a control box comprising a battery power source wherein the control box and the detector box are spaced apart no more than 4 feet, but still at a distance such that an absolute magnetic field deviation of a signal detected by the coils as a result of proximity of the battery power source is not greater than 1 picotesla and a maximum allowable tolerance of the absolute magnetic field deviation being equal to or less than four percent; and
a handle coupled to the control box for carrying the mobile system, the handle including a trigger for triggering detection of the magnetic field using the plurality of magnetic coils simultaneously.

20. A system for detecting a location of a subsurface channel, comprising:
a detector box, comprising:
a magnetic coil oriented in a x direction,
a magnetic coil oriented in a y direction and orthogonal to the magnetic coil oriented in the x direction, and
a magnetic coil oriented in a z direction and orthogonal to the magnetic coils oriented in the x and y directions, wherein the magnetic coils in the x, y and z directions are spaced apart from one another and ends of each of the magnetic coil are unobstructed by each of the other of the magnetic coils, wherein the magnetic coils measure magnetic field generated by electric current flow through the subsurface channel, and wherein the system is capable of being hand carried between measurement stations; and circuitry configured to read signals measured from each of the magnetic coils simultaneously, wherein the signals are compared to establish polarity for determining a preferential flow path of the subsurface channel.

21. The system of claim 20, wherein each of the magnetic coils are spaced apart from both of the other magnetic coils by at least one inch and less than one foot.

22. The system of claim 20, further comprising a battery power source, wherein the magnetic coils are spaced apart from the battery power source such that an electrical current from the battery power source flows away from the magnetic coils.

23. The system of claim 20, further comprising a battery power source, wherein the magnetic coils are spaced apart from the battery power source at a distance such that an effect of the battery power source on the magnetic coils is an absolute magnetic field deviation of not more than 1%.

24. The system of claim 20, further comprising a battery power source, wherein the magnetic coils are spaced apart from the battery power source at a distance such that an effect of the battery power source on the magnetic coils is an absolute magnetic field deviation of not more than 1 picoteslas.

25. The system of claim 20, further comprising circuitry configured to read signals measured from at least two of the magnetic coils simultaneously.

26. The system of claim 20, further comprising an accelerometer to measure an orientation of the coils.

27. The system of claim 20, further comprising a compass for measuring an orientation of the coils.

28. The system of claim 20, further comprising GPS for measuring a geographical location of the coils.

29. The system of claim 20, further comprising a battery and wherein the battery and the detector box comprising the magnetic coils are positioned in a columnar arrangement with the magnetic coils are suspended beneath the battery and spaced apart from the battery by a distance.

30. The system of claim 20, wherein the magnetic coil oriented in the x direction surrounds a central core of ferromagnetic material, the magnetic coil oriented in the y direction surrounds a central core of ferromagnetic material, and the magnetic coil oriented in the z direction surrounds a central core of ferromagnetic material.

* * * * *